(12) United States Patent
Ono et al.

(10) Patent No.: US 11,081,759 B2
(45) Date of Patent: Aug. 3, 2021

(54) SECONDARY BATTERY (71) Applicant: TOYOTA JIDOSHA KABUSHIKI KAISHA, Toyota (JP)

(72) Inventors: Tomohiro Ono, Miyoshi (JP); Yuta Nemoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 15/685,511

(22) Filed: Aug. 24, 2017

(65) Prior Publication Data

US 2018/0062132 A1 Mar. 1, 2018

(30) Foreign Application Priority Data

Aug. 26, 2016 (JP) .............................. JP2016-166275

(51) Int. Cl.
*H01M 50/308* (2021.01)
*H01G 11/82* (2013.01)
*H01G 11/80* (2013.01)
*H01G 11/18* (2013.01)
*H01M 50/342* (2021.01)
*H01M 50/383* (2021.01)
*H01M 10/0525* (2010.01)
*H01M 10/52* (2006.01)
(Continued)

(52) U.S. Cl.
CPC .......... *H01M 50/308* (2021.01); *H01G 11/18* (2013.01); *H01G 11/80* (2013.01); *H01G 11/82* (2013.01); *H01M 10/0525* (2013.01); *H01M 10/52* (2013.01); *H01M 50/342* (2021.01); *H01M 50/383* (2021.01); *H01M 10/058* (2013.01); *H01M 50/10* (2021.01); *Y02E 60/10* (2013.01)

(58) Field of Classification Search
CPC ............. H01M 2/1235; H01M 2/1247; H01M 2/1205; H01M 10/52; H01M 10/0525; H01M 50/383; H01M 50/342; H01M 50/308; H01M 50/10; H01M 10/058; H01G 11/82; H01G 11/18; H01G 11/80; Y02E 60/10
USPC .................................................. 429/57, 338
See application file for complete search history.

(56) References Cited

U.S. PATENT DOCUMENTS

2012/0003512 A1 1/2012 Kohno et al.
2012/0052341 A1 3/2012 Kim et al.
(Continued)

FOREIGN PATENT DOCUMENTS

CN 102903883 A 1/2013
CN 104934630 A 9/2015
(Continued)

*Primary Examiner* — Cynthia H Kelly
*Assistant Examiner* — Omar M Kekia
(74) *Attorney, Agent, or Firm* — Sughrue Mion, PLLC (57) ABSTRACT

The present invention provides a secondary battery 1 including: a battery case 10 having a safety valve 13; an electrode body 40; an electrolyte; and a cover member 41 arranged between the safety valve 13 and the electrode body 40 so as to be separated from the safety valve 13. The electrode body 40 is housed in the battery case 10 so that a lamination surface opposes the safety valve 13. The cover member 41 is configured to cover a portion of the battery case 10 in which the safety valve 13 is formed in a state where the cover member 41 holds the lamination surface of the electrode body 40.

4 Claims, 4 Drawing Sheets

(51) Int. Cl.
*H01M 10/058* (2010.01)
*H01M 50/10* (2021.01)

(56) References Cited

U.S. PATENT DOCUMENTS

| | | | |
|---|---|---|---|
| 2013/0029188 A1* | 1/2013 | Kim | H01M 2/18 |
| | | | 429/53 |
| 2014/0127538 A1 | 5/2014 | Uruno et al. | |
| 2015/0194639 A1* | 7/2015 | Jeoung | H01M 2/26 |
| | | | 429/94 |
| 2015/0270551 A1* | 9/2015 | Nishi | H01M 4/13 |
| | | | 429/200 |
| 2016/0056423 A1* | 2/2016 | Seo | H01M 2/0456 |
| | | | 429/179 |

FOREIGN PATENT DOCUMENTS

| | | |
|---|---|---|
| JP | 06338304 A | 12/1994 |
| JP | 08212986 A | 8/1996 |
| JP | 2009004361 A | 1/2009 |
| JP | 2010103027 A | 5/2010 |
| JP | 2012054236 A | 3/2012 |
| JP | 2013-025882 A | 2/2013 |
| JP | 2014149933 A | 8/2014 |

\* cited by examiner

SECONDARY BATTERY

CROSS REFERENCE TO RELATED APPLICATIONS

The present application claims priority on the basis of Japanese Patent Application No. 2016-166275 filed in Japan on Aug. 26, 2016, the entire contents of which are incorporated herein by reference.

BACKGROUND OF THE INVENTION

1. Field of the Invention

The present invention relates to a secondary battery. More specifically, the present invention relates to a secondary battery including a safety valve.

2. Description of the Related Art

With a secondary battery such as a lithium-ion secondary battery, when a short-circuit occurs inside the battery, gas may be generated inside the battery due to electrolysis of components of an electrode or an electrolyte, vaporization of components of the electrolyte caused by a rise in temperature inside the battery, and the like. When gas accumulates inside the battery, internal pressure of the battery may rise and cause the battery to swell significantly. In consideration thereof, a secondary battery is generally provided with a safety valve for releasing internal pressure of the battery when the internal pressure has risen to a prescribed value.

For example, Japanese Patent Application Publication No. 2013-25882 discloses disposing, in a secondary battery including a battery case having a safety valve for releasing internal pressure and an electrode body and an electrolyte housed inside the battery case, an insulating plate having a plurality of openings to act as gas flow channels between the safety valve and the electrode body. According to the insulating plate described in Japanese Patent Application Publication No. 2013-25882, flow channels of gas can be secured by the plurality of openings and, at the same time, contents of the battery case including members such as a current collector or the like having been broken by a force of discharge of gas can be prevented from being ejected from the safety valve.

However, a secondary battery mounted to a mobile object such as an automobile is subjected to external stress such as vibration and impact. According to a study carried out by the present inventors, when vibration, an impact, or the like is applied to the secondary battery disclosed in Japanese Patent Application Publication No. 2013-5882, there is a risk that the insulating plate may become displaced from a prescribed disposal position and may interfere with the electrode body. In addition, for example, when a lamination surface (in other words, a surface on which a positive electrode and a negative electrode are laminated) of the electrode body opposes the safety valve, there is a risk that contents smaller than an opening of the insulating plate such as fragments of an active material layer having been delaminated due to a force of gas discharge may be ejected from the safety valve via the opening.

SUMMARY OF THE INVENTION

The present invention has been made in consideration of the situations described above and an object thereof is to provide a secondary battery capable of reducing interference among members inside a battery case and more reliably preventing contents from being ejected from a safety valve.

The present invention provides a secondary battery including: a battery case having a safety valve which releases internal pressure; an electrode body in which a positive electrode and a negative electrode are laminated in an insulated state and housed inside the battery case; an electrolyte housed inside the battery case; and a cover member arranged inside the battery case and between the safety valve and the electrode body so as to be separated from the safety valve. The electrode body is housed in the battery case so that a lamination surface on which the positive electrode and the negative electrode are laminated opposes the safety valve. The cover member is configured to cover a portion of the battery case in which the safety valve is formed in a state where the cover member holds the lamination surface of the electrode body.

In the secondary battery configured as described above, the electrode body is held by the cover member. In other words, the electrode body and the cover member are unitized. Therefore, even when vibration, an impact, or the like is applied from the outside, the electrode body and the cover member move integrally and interference between the electrode body and the cover member can be suppressed. In addition, in the secondary battery configured as described above, the cover member is arranged so as to cover a portion in which the safety valve is formed. Therefore, contents of the secondary battery (for example, fragments of an active material layer) can be effectively prevented from being ejected from the safety valve.

In a preferable aspect of the secondary battery disclosed herein, the cover member holds the electrode body from a direction of lamination.

Generally, with an electrode body in which a positive electrode and a negative electrode are laminated, a constraining member shaped like a tape, a rope, or the like is used in order to maintain a laminate structure during construction of a secondary battery. In contrast, in the secondary battery configured as described above, the electrode body is held by the cover member from the direction of lamination. Accordingly, the cover member can also function as a constraining member which maintains the laminate structure of the electrode body. Therefore, the secondary battery can be constructed while maintaining the laminate structure of the electrode body in a stable manner without having to separately use a constraining member. As a result, the number of members used to construct the secondary battery can be reduced and a reduction in cost can be achieved.

In a preferable aspect of the secondary battery disclosed herein, the positive electrode comprises a positive electrode current collector-exposed portion in which a positive electrode active material layer is not formed. The negative electrode comprises a negative electrode current collector-exposed portion in which a negative electrode active material layer is not formed. The cover member holds the electrode body in at least one of the positive electrode current collector-exposed portion and the negative electrode current collector-exposed portion.

In a portion being held by the cover member, higher tension may be applied to the electrode body in comparison to a portion not being held by the cover member. By holding the electrode body in a current collector-exposed portion in which an active material layer is not formed, unevenness in charge and discharge can be suppressed and battery reaction can be uniformalized. As a result, change and discharge can be performed more stably and superior battery characteristics can be exhibited over a long period of time.

In a preferable aspect of the secondary battery disclosed herein, the positive electrode comprises a positive electrode active material layer. The negative electrode comprises a negative electrode active material layer. The cover member is configured to cover the positive electrode active material layer and the negative electrode active material layer on the lamination surface of the electrode body.

As a result, contents of the secondary battery (for example, fragments of an active material layer) can be prevented from being ejected from the safety valve at an even higher level.

In a preferable aspect of the secondary battery disclosed herein, the cover member comprises a holding portion which holds the lamination surface of the electrode body, and a shielding screen portion which covers a portion in which the safety valve is formed. The holding portion and the shielding screen portion are integrally formed.

As a result, compared to a case where the holding portion and the shielding screen portion are provided as separate members, the number of members used to construct the secondary battery can be reduced and a reduction in cost can be achieved.

DETAILED DESCRIPTION OF THE PREFERRED EMBODIMENTS

Hereinafter, preferred embodiments of a secondary battery disclosed herein will be described. It should be noted that, with the exception of matters specifically mentioned in the present specification, matters required to implement the present invention can be understood to be design matters of a person with ordinary skill in the art based on the prior art in the relevant technical field. The secondary battery disclosed herein can be implemented based on the contents disclosed in the present specification and common general technical knowledge in the relevant field. Furthermore, in the following drawings, members and portions that produce the same effects will be described using the same reference characters and overlapping descriptions may sometimes be omitted or simplified. In addition, dimensional relationships (length, width, thickness, and the like) shown in the respective drawings may be deformed in order to facilitate understanding and do not necessarily reflect actual dimensional relationships.

First, a secondary battery 1 will be described. It should be noted that, in the present specification, "secondary battery" is a term which describes repetitively chargeable and dischargeable storage devices in general and which encompasses so-called storage batteries such as a lithium ion secondary battery and a nickel hydride battery as well as storage elements such as an electrical double layer capacitor.

Figure 1:
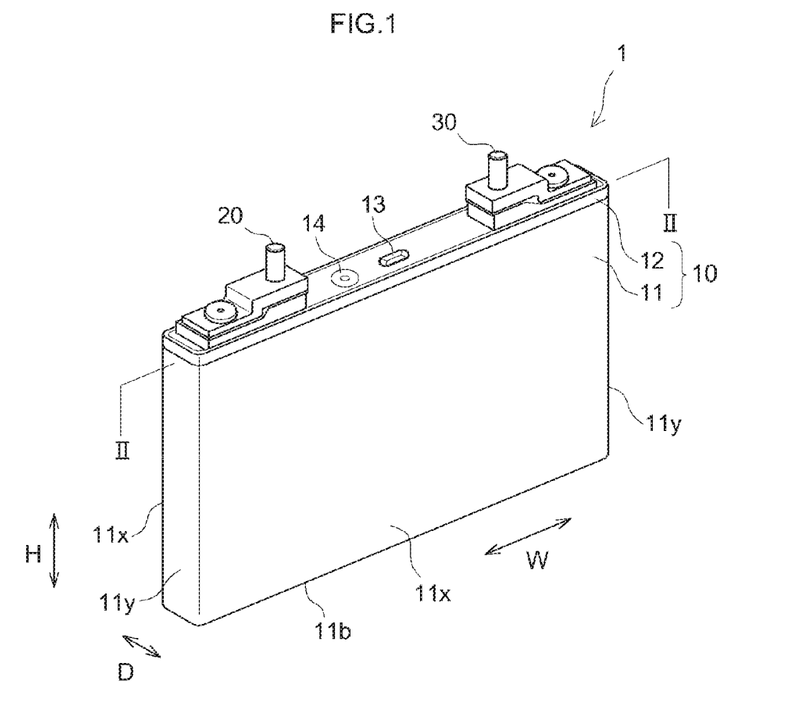
FIG. 1 is a perspective view schematically showing an external shape of a secondary battery according to an embodiment.
Figure 2:
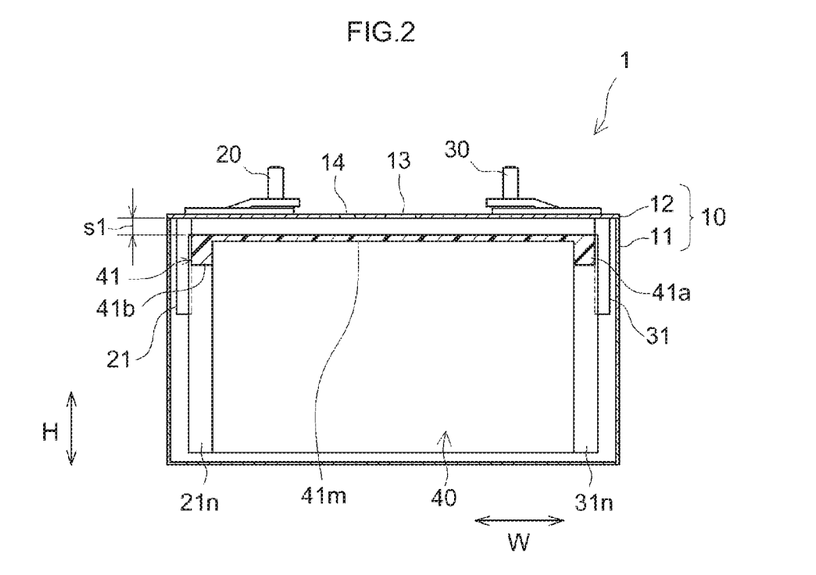
FIG. 2 is a longitudinal sectional view taken along line in FIG. 1.

FIG. 1 is a perspective view schematically showing an external shape of the secondary battery 1 according to an embodiment. FIG. 2 is a longitudinal sectional view taken along line II-II of the secondary battery 1 in FIG. 1. In the drawings, reference character W denotes a width direction, reference character D denotes a thickness direction, and reference character H denotes a height direction. However, these directions are only provided in order to facilitate understanding and are not intended to limit modes of installation of the secondary battery 1 in any way whatsoever.

The secondary battery 1 includes a battery case 10, an electrode body 40, an electrolyte (not shown), and a cover member 41.

The battery case 10 is a container which houses the electrode body 40, the electrolyte, and the cover member 41. In the present embodiment, the battery case 10 has an exterior shape of a bottomed rectangle (a rectangular parallelepiped). The battery case 10 includes a bottomed flat case main body 11 with an opening at an upper end thereof and a lid 12 that covers the opening of the case main body 11. The case main body 11 includes a rectangular bottom surface 11b and, as side surfaces, a pair of broad width surfaces 11x and a pair of narrow width surfaces 11y. For example, the battery case 10 is made of a metallic material such as aluminum or steel.

A positive electrode terminal 20 and a negative electrode terminal 30 for external connection protrude from an upper surface of the battery case 10 or, in other words, the lid 12. The positive electrode terminal 20 is electrically connected to a positive electrode sheet (not shown) of the electrode body 40. The negative electrode terminal 30 is electrically connected to a negative electrode sheet (not shown) of the electrode body 40. A safety valve 13 and an electrolyte injection hole 14 are also provided on the lid 12. The safety valve 13 is formed thinner than the other portions of the battery case 10. The safety valve 13 is designed to release internal pressure of the battery case 10. More specifically, the safety valve 13 is configured to be capable of discharging gas accumulated inside the battery case 10 to the outside when the internal pressure of the battery case 10 rises to a prescribed value. The electrolyte injection hole 14 is to be used to inject a liquid electrolyte. After injection of the electrolyte, a cap is attached to the electrolyte injection hole 14 to hermetically seal the electrolyte injection hole 14.

The electrode body 40, the electrolyte, and the cover member 41 are housed inside the battery case 10. Configurations of the electrode body 40 and the electrolyte may be similar to those of conventionally-known secondary batteries and are not particularly limited. In this case, the electrode body 40 is a laminated electrode body. Typically, the electrode body 40 includes a plurality of rectangular positive electrode sheets and a plurality of rectangular negative electrode sheets. The positive electrode sheets and the negative electrode sheets are laminated in a direction of lamination in an insulated state. In this case, the direction of lamination of the electrode body 40 is the thickness direction D. Alternatively, the electrode body 40 may be a wound electrode body created by laminating and winding an elongated positive electrode sheet and an elongated negative electrode sheet.

The positive electrode sheet includes a positive electrode current collector 21n and a positive electrode active material layer (not shown) formed on a surface of the positive electrode current collector 21n. The positive electrode active material layer contains a positive electrode active material (for example, a lithium-transition metal compound oxide). In the present embodiment, in the width direction W, the positive electrode active material layer is formed shorter than a total width of the positive electrode current collector 21n. In addition, in the height direction H, the positive electrode active material layer is formed with a same length as the total width of the positive electrode current collector 21n.

The negative electrode sheet includes a negative electrode current collector 31n and a negative electrode active material layer (not shown) formed on a surface of the negative electrode current collector 31n. The negative electrode active material layer contains a negative electrode active material (for example, graphite). In the present embodiment, in the width direction W, the negative electrode active material layer is formed shorter than a total width of the negative electrode current collector 31n. In addition, in the height direction H, the negative electrode active material layer is formed with a same length as the total width of the negative electrode current collector 31n.

A laminate portion in which the positive electrode active material layer and the negative electrode active material layer are laminated (for example, via a separator made of resin) in an insulated state is formed in a central portion of the electrode body 40 in the width direction W.

On the other hand, a portion of the positive electrode current collector 21n in which the positive electrode active material layer is not formed (a positive electrode current collector-exposed portion) protrudes from the laminate portion at a left end of the electrode body 40 in the width direction W. A positive electrode current collecting plate 21 for foil collection and current collection is attached to the positive electrode current collector-exposed portion. The positive electrode sheet of the electrode body 40 is electrically connected to the positive electrode terminal 20 via the positive electrode current collecting plate 21.

In addition, a portion of the negative electrode current collector 31n in which the negative electrode active material layer is not formed (a negative electrode current collector-exposed portion) protrudes from the laminate portion at a right end of the electrode body 40 in the width direction W. A negative electrode current collecting plate 31 for foil collection and current collection is attached to the negative electrode current collector-exposed portion. The negative electrode sheet of the electrode body 40 is electrically connected to the negative electrode terminal 30 via the negative electrode current collecting plate 31.

The electrode body 40 includes a pair of rectangular flat surfaces (not shown) and four lamination surfaces (end surfaces, not shown) which connect the pair of flat surfaces. The flat surfaces of the electrode body 40 respectively oppose the pair of broad width surfaces 11x as side surfaces of the battery case 10. The four lamination surfaces of the electrode body 40 respectively oppose the upper surface (in other words, the lid 12), the bottom surface 11b, and the pair of narrow width surface 11y as side surfaces of the battery case 10. Therefore, one of the lamination surfaces of the electrode body 40 opposes the safety valve 13 of the battery case 10.

The cover member 41 is arranged between the safety valve 13 provided on the lid 12 and the electrode body 40 as viewed in the height direction H or, in other words, a direction connecting the bottom surface 11b of the case main body 11 and the lid 12. The cover member 41 is arranged at a position separated from the safety valve 13. In the height direction H, a space between the lid 12 and the electrode body 40 becomes a gas flow channel through which gas generated inside the battery case 10 flows toward the safety valve 13. From the perspective of suitably securing a gas flow channel to the safety valve 13 and quickly opening the safety valve 13 when internal pressure rises, a distance from the lid 12 to the electrode body 40 or, in other words, a distance of separation s1 from a lower end of the lid 12 to an upper end of the electrode body 40 is favorably set to about 1 mm or more such as 2 mm or more. In addition, from the perspective of increasing occupancy of the electrode body 40 in the battery case 10 and increasing energy density of the secondary battery 1, the distance of separation s1 is favorably set to about 5 mm or less such as 4 mm or less. Moreover, in the present embodiment, the distance of separation s1 is approximately 4 mm.

Figure 3:
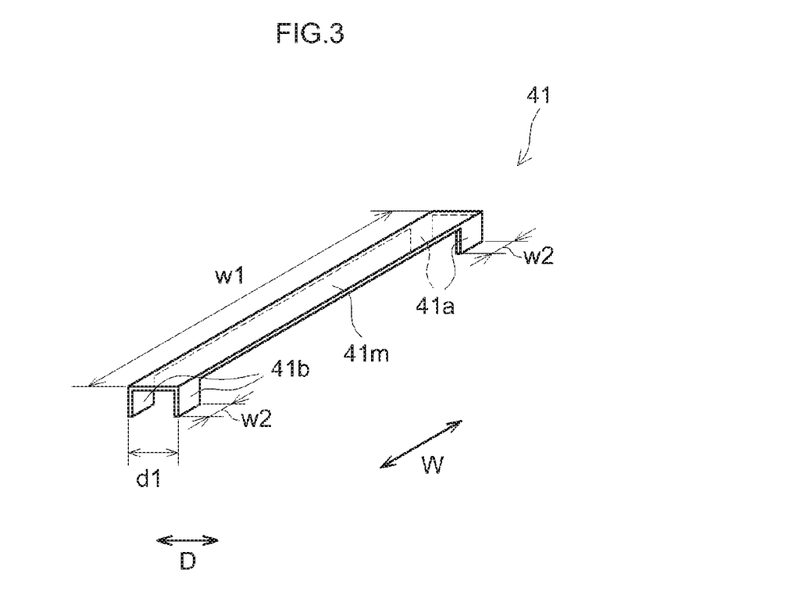
FIG. 3 is a perspective view schematically showing a cover member shown in FIG. 2.

FIG. 3 is a perspective view schematically showing the cover member 41 shown in FIG. 2. Typically, the cover member 41 is entirely insulative. The cover member 41 includes a shielding screen portion 41m and two holding portions 41a and 41b. In the present embodiment, the holding portions 41a and 41b are positioned at both ends of the shielding screen portion 41m. In addition, the shielding screen portion 41m and the two holding portions 41a and 41b are integrally formed.

The shielding screen portion 41m is a portion which prevents contents of the secondary battery 1 from being ejected from the safety valve 13. During an internal short circuit, internal temperature of the secondary battery 1 may rise. Therefore, the shielding screen portion 41m favorably has a high upper temperature limit. For example, a surface of the shielding screen portion 41m favorably has a continuously-usable upper temperature limit of about 80° C. or higher and, typically, 100° C. or higher such as around 100 to 300° C. The shielding screen portion 41m is made of, for example, resin. Specific examples include thermoplastic resins including polypropylene (PP), fluorine-based resins such as tetrafluoroethylene (PTFE), a tetrafluoroethylene-hexafluoropropylene copolymer (FEP), a tetrafluoroethylene-perfluoroalkoxyethylene copolymer (PFA), and a tetrafluoroethylene-ethylene copolymer (FIFE), and phenolic resins such as novolac as well as thermosetting resins including melamine resin. In particular, fluorine-based resins are favorable due to superior heat resistance and chemical durability. The shielding screen portion 41m may be configured such that, for example, a surface of a core made of a conductive material such as metal is coated by an insulating resin layer made of the material described above.

In the present embodiment, the shielding screen portion 41m has a flat plate shape in a planar view and in a sectional view. A length w1 of the shielding screen portion 41m in the width direction W is longer than a length of the safety valve 13 in the width direction W. The length w1 of the shielding screen portion 41m in the width direction W is longer than a length in the width direction W of the laminate portion of the electrode body 40 or, in other words, the portion in which the positive electrode active material layer and the negative electrode active material layer are laminated. The length w1 of the shielding screen portion 41m in the width direction W is the same as a length of the electrode body 40 in the width direction W. Alternatively, the length w1 of the shielding screen portion 41m in the width direction W may be shorter or longer than the length of the electrode body 40 in the width direction W.

In addition, in the present embodiment, a length d1 of the shielding screen portion 41m in the thickness direction D is longer than a length of the safety valve 13 in the thickness direction D. The length d1 of the shielding screen portion 41m in the thickness direction D is longer than a length of the laminate portion of the electrode body 40 in the thickness direction D. The length d1 of the shielding screen portion 41m in the thickness direction D is the same as a length of the electrode body 40 in the thickness direction D. Alternatively, the length d1 of the shielding screen portion 41m in the thickness direction D may be shorter or longer than the length of the electrode body 40 in the thickness direction D. In addition, the length of the shielding screen portion 41m in the thickness direction D may be the same over the entire length w1 in the width direction W or may vary locally. For example, the length in the thickness direction D of a part in contact with the holding portions 41a and 41b of the shielding screen portion 41m may be relatively shorter as compared to other parts.

The shielding screen portion 41m covers a portion of the safety valve 13 provided on the lid 12 in the height direction H. The shielding screen portion 41m covers a portion of the electrolyte injection hole 14 provided on the lid 12 in the height direction H. The shielding screen portion 41m covers an entire lamination surface opposing the safety valve 13 of the electrode body 40 in the width direction W. The shielding screen portion 41m covers a portion of the positive electrode active material layer and the negative electrode active material layer of the electrode body 40 in the width direction W. According to such a configuration, contents of the secondary battery 1 can be prevented from being ejected from the safety valve 13 at a high level.

The holding portions 41a and 41b hold the lamination surface on a side opposing the safety valve 13 of the electrode body 40. The holding portions 41a and 41b are favorably elastic so as to be capable of holding the electrode body 40. For example, percent elongation (%) based on ASTM D368 is favorably about 100 or more such as approximately 100 to 1000. In addition, a modulus of elasticity in tension ($\times 10^4$ kg/cm$^2$) based on ASTM D368 is favorably about 2 or less such as approximately 0.1 to 2. In the present embodiment, the holding portions 41a and 41b are formed using a similar resin material to the shielding screen portion 41m. Alternatively, the holding portions 41a and 41b may be formed using a material that differs from the shielding screen portion 41m. The holding portions 41a and 41b may include a biasing member such as a spring which imparts a biasing force toward the electrode body 40.

In the present embodiment, the holding portions 41a and 41b hold the electrode body 40 from a direction of lamination (in other words, the thickness direction D) of the electrode body 40. In other words, the holding portions 41a and 41b hold the electrode body 40 by pressing inward the pair of flat surfaces of the electrode body 40 which opposes the broad width surfaces 11x. In other words, the electrode body 40 is slightly tensioned in the direction of lamination by the holding portions 41a and 41b. Accordingly, stacked positive electrode sheets and negative electrode sheet are prevented from becoming delaminated and the laminate structure is prevented from shifting sideways, thereby enabling the laminate structure to be better maintained. Therefore, with the technique disclosed herein, a constraining member shaped like a tape, a rope, or the like which is conventionally used in order to maintain a laminate structure is no longer required.

In the present embodiment, the holding portion 41a holds the negative electrode current collector-exposed portion of the negative electrode current collector 31n protruding to the right end of the electrode body 40. A length w2 of the holding portion 41a in the width direction W is longer than a length in the width direction W of the negative electrode current collector-exposed portion protruding to the right end of the electrode body 40. Alternatively, the length w2 of the holding portion 41a in the width direction W may be the same as or longer than the length of the negative electrode current collector-exposed portion in the width direction W. In addition, a length of the holding portion 41a in the height direction H is shorter than a length of the negative electrode current collector-exposed portion in the height direction H. Alternatively, the length of the holding portion 41a in the height direction H may be the same as or longer than the length of the negative electrode current collector-exposed portion in the height direction H.

In addition, the holding portion 41b holds the positive electrode current collector-exposed portion of the positive electrode current collector 21n protruding to the left end of the electrode body 40. A length w2 of the holding portion 41b in the width direction W is the same as the length of the holding portion 41a in the width direction W. Alternatively, the length w2 of the holding portion 41b in the width direction W may differ from the length w2 of the holding portion 41a in the width direction W. The length w2 of the holding portion 41b in the width direction W is longer than a length in the width direction W of the positive electrode current collector-exposed portion protruding to the left end of the electrode body 40. Alternatively, the length w2 of the holding portion 41b in the width direction W may be the same as or longer than the length of the positive electrode current collector-exposed portion in the width direction W.

As described above, in the secondary battery 1, the electrode body 40 is held by the cover member 41. Accordingly, the electrode body 40 and the cover member 41 are configured as a single unit. Therefore, even when vibration, an impact, or the like is applied from the outside, the electrode body 40 and the cover member 41 move integrally and the electrode body 40 and the cover member 41 are prevented from bumping into each other. In addition, in the secondary battery 1, the cover member 41 is arranged so as to cover an inside portion of the safety valve 13. As result, for example, even in a mode in which the lamination surface of the electrode body 40 which is readily damaged by a force of gas discharge or the like opposes the safety valve 13, contents of the secondary battery 1 can be effectively prevented from being ejected from the safety valve 13.

In addition, in a conventional configuration in which the electrode body and the cover member are separately provided, a long distance of separation from the lid to the electrode body must be secured in order to attach the cover member or to prevent interference between the electrode body and the cover member when vibration, an impact, or the like is applied from the outside.

In contrast, with the secondary battery 1 disclosed herein, the cover member 41 can be arranged close to the electrode body 40 by unitizing the electrode body 40 and the cover member 41. Therefore, compared to a conventional configuration in which the electrode body 40 and the cover member 41 are separately provided, the distance of separation s1 from the lid 12 to the electrode body 40 can be shortened. Accordingly, with the secondary battery 1, occupancy of the electrode body 40 which contributes to charge and discharge can be increased. As a result, a space (dead space) which does not contribute to charge and discharge inside the battery case 10 can be reduced and higher capacity can be achieved. Furthermore, contents of the secondary battery 1 can be more effectively prevented from being ejected from the safety valve 13.

While the secondary battery 1 can be used in various applications, the secondary battery 1 characteristically has high energy density and superior reliability in the event of an internal short circuit. Therefore, by taking advantage of such characteristics, the secondary battery 1 can be adopted for a large-size battery with particularly high energy density. Specifically, for example, the secondary battery 1 can be favorably adopted for a large-capacity secondary battery with a theoretical capacity of 10 Ah or more (for example 10 to 250 Ah), 50 Ah or more, and even 100 Ah or more (for example, 100 to 200 Ah). In addition, the secondary battery 1 can be preferably used in applications readily subjected to external stress such as vibration and impact. For example, the secondary battery 1 can be preferably used as a power supply (drive power supply) for a motor mounted to a vehicle. While a type of the vehicle is not particularly limited, typical examples include a plug-in hybrid vehicle (PHV), a hybrid vehicle (HV), and an electric vehicle (EV).

While a detailed explanation of the present invention has been given above, the embodiment and the examples described above are merely exemplary and the invention disclosed herein includes various alterations and modifications of the specific examples described above.

For example, while the shielding screen portion 41*m* and the two holding portions 41*a* and 41*b* of the cover member 41 are integrally formed in the embodiment described above, this configuration is not restrictive.

Figure 4:
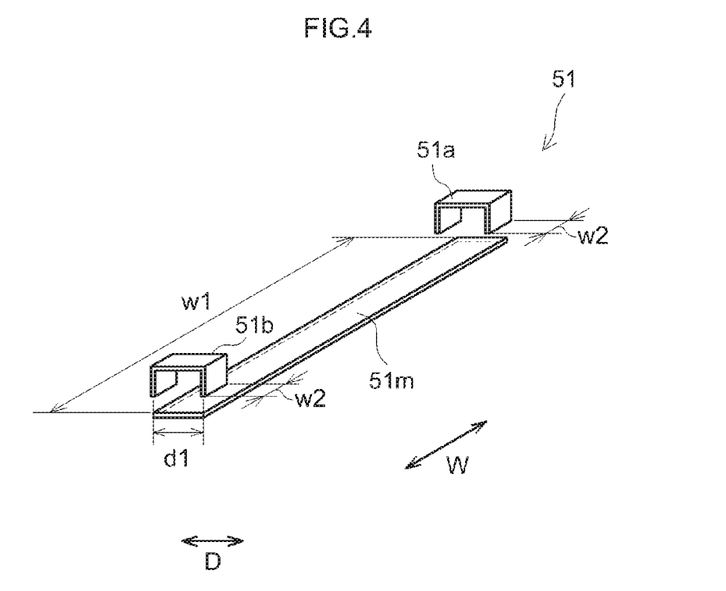
FIG. 4 is a perspective view schematically showing a cover member according to another embodiment.

FIG. 4 is a perspective view schematically showing a cover member 51 according to another embodiment. The cover member 51 includes a shielding screen portion 51*m* and two holding members 51*a* and 51*b*. In the present embodiment, the shielding screen portion 51*m* and the holding members 51*a* and 51*b* are respectively separate bodies. The two holding members 51*a* and 51*b* respectively have U-shapes and collectively hold the electrode body 40 and the shielding screen portion 51*m*. Even the cover member 51 in this mode can be favorably used in the secondary battery 1.

For example, while the holding portion 41*a* and 41*b* hold the electrode body 40 at the two locations of the left end and the right end of the electrode body 40 in the embodiment described above, this configuration is not restrictive.

Figure 5:
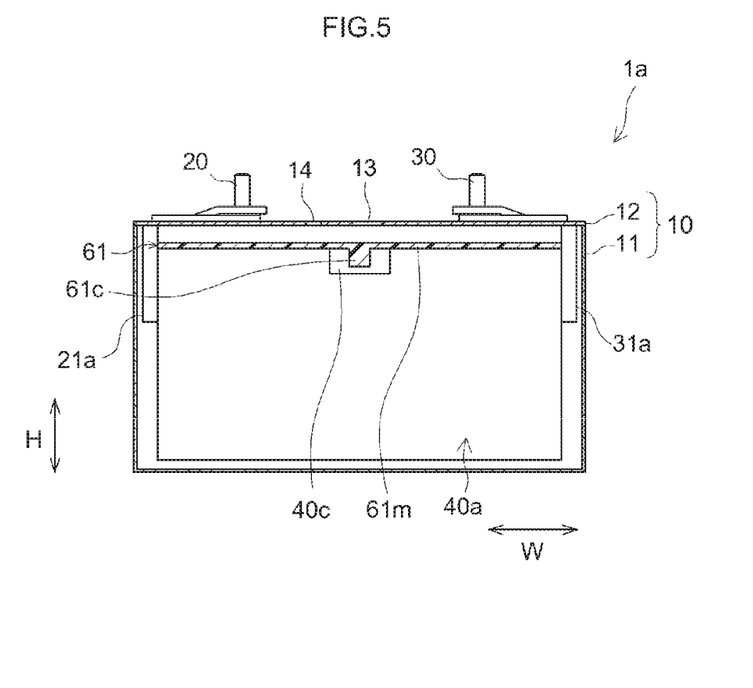
FIG. 5 is a longitudinal sectional view schematically showing a secondary battery according to another embodiment.

FIG. 5 is a longitudinal sectional view schematically showing a secondary battery 1*a* according to another embodiment. The secondary battery 1*a* includes an electrode body 40*a*, an electrolyte (not shown), and a cover member 61. A positive electrode sheet (not shown) of the electrode body 40*a* includes a positive electrode active material layer formed with a same length as a total width of a positive electrode current collector in the width direction W. A negative electrode sheet (not shown) of the electrode body 40*a* includes a negative electrode active material layer (not shown) formed with a same length as a total width of a negative electrode current collector in the width direction W. A positive electrode current collecting plate 21*a* for end surface current collection is attached to a left end of the electrode body 40*a* in the width direction W. A negative electrode current collecting plate 31*a* for end surface current collection is attached to a right end of the electrode body 40*a* in the width direction W. The positive electrode sheet and the negative electrode sheet of the electrode body 40*a* both include a portion 40*c* in which an active material layer is not formed near center in the width direction W.

Figure 6:
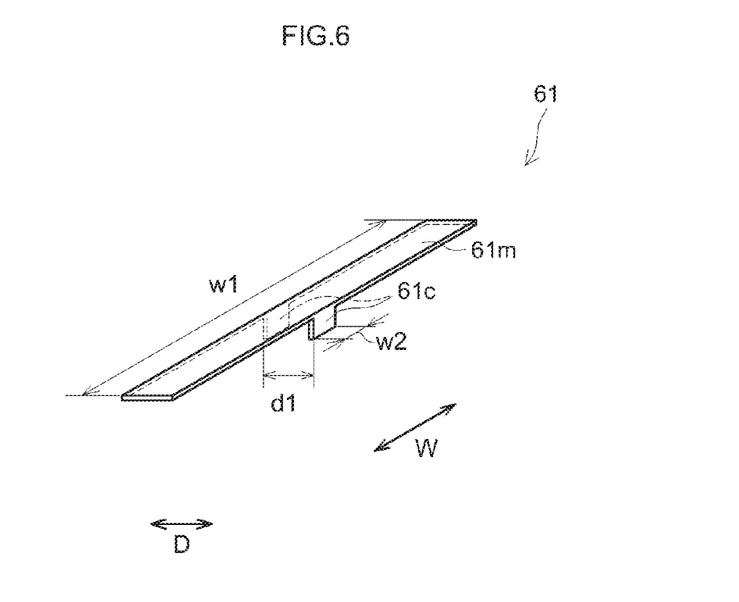
FIG. 6 is a perspective view schematically showing a cover member shown in FIG. 5.

FIG. 6 is a perspective view schematically showing the cover member 61 shown in FIG. 5. The cover member 61 includes a shielding screen portion 61*m* and a holding portion 61*c*. The shielding screen portion 61*m* and the holding portion 61*c* are integrally formed. In the present embodiment, the holding portion 61*c* is positioned at center of the shielding screen portion 61*m*. The holding portion 61*c* holds the portion 40*c* of the electrode body 40*a* in which an active material layer is not formed.

For example, while the shielding screen portions 41*m*, 51*m*, and 61*m* of the cover members 41, 51, and 61 have a flat plate shape in a sectional view in the embodiments described above, this configuration is not restrictive. For example, the shielding screen portions 41*m*, 51*m*, and 61*m* may have a wave shape, a bow shape, a hill shape, or the like in a sectional view. In addition, a projected portion, an inclined portion, a plaited portion, a folded portion, or the like may be provided on a surface of the shielding screen portions 41*m*, 51*m*, and 61*m* opposing the safety valve 13 at, for example, a position in proximity of the safety valve 13. Accordingly, the shielding screen portions 41*m*, 51*m*, and 61*m* of the cover members 41, 51, and 61 and the safety valve 13 can be preferably separated from each other. Furthermore, contents of the secondary battery 1 can be more effectively prevented from being ejected from the safety valve 13.

While preferred embodiments of the present invention have been described above, it is to be understood that variations and modifications will be apparent to those skilled in the art without departing from the scope and spirit of the present invention.

What is claimed is:

1. A secondary battery, comprising:
   a battery case comprising a case main body with an opening at an end thereof and a lid that covers the opening of the case main body;
   a safety valve which releases internal pressure, said safety valve being provided on the lid;
   an electrode body in which a positive electrode and a negative electrode are laminated in an insulated state and housed inside the battery case;
   an electrolyte housed inside the battery case; and
   a cover member arranged inside the battery case and between the lid and the electrode body so as to be separated from the safety valve provided on the lid, wherein
   the positive electrode comprises a positive electrode active material layer and a positive electrode current collector-exposed portion in which the positive electrode active material layer is not formed,
   the negative electrode comprises a negative electrode active material layer and a negative electrode current collector-exposed portion in which the negative electrode active material layer is not formed,
   the electrode body is housed in the battery case so that a lamination surface on which the positive electrode and the negative electrode are laminated opposes the safety valve,
   the cover member comprises a holding portion which holds the electrode body, and a shielding screen portion which covers a portion of the lid in which the safety valve is formed, and
   both the holding portion and the shielding screen portion are entirely insulative, wherein
   the holding portion contacts each of the positive electrode current collector-exposed portion and the negative electrode current collector-exposed portion in a thickness direction of the electrode body at the position opposing the lid, but does not contact the positive electrode active material layer and the negative electrode active material layer.

2. The secondary battery according to claim 1, wherein the holding portion of the cover member presses the positive electrode current collector-exposed portion and the negative electrode current collector-exposed portion of the electrode body inward in a lamination direction of the electrode body so that the electrode body is tensioned in the thickness direction by the holding portion.

3. The secondary battery according to claim 1, wherein the shielding screen portion of the cover member is configured to cover the positive electrode active material layer and the negative electrode active material layer on the lamination surface of the electrode body.

4. The secondary battery according to claim 1, wherein the holding portion and the shielding screen portion of the cover member are integrally formed.

* * * * *